United States Patent [19]
Kimura

[11] Patent Number: 5,091,627
[45] Date of Patent: Feb. 25, 1992

[54] LASER BEAM CONTROLLER FOR SURVEYING EQUIPMENT

[75] Inventor: Akio Kimura, Tokyo, Japan
[73] Assignee: Kabushiki Kaisha Topcon, Japan
[21] Appl. No.: 614,445
[22] Filed: Nov. 16, 1990
[30] Foreign Application Priority Data
Nov. 17, 1989 [JP] Japan .................................. 1-299171
Nov. 17, 1989 [JP] Japan .................................. 1-299172
[51] Int. Cl.[5] .................................................. B23K 26/00
[52] U.S. Cl. ......................... 219/121.83; 219/121.62; 250/205
[58] Field of Search ............. 219/121.83, 121.75, 219/121.73, 121.61, 121.62; 250/205, 201.1

[56] References Cited

U.S. PATENT DOCUMENTS 3,533,707 6/1965 Weiss .................................... 356/253
3,864,037 2/1975 Johnson ........................... 250/213.25
4,443,696 4/1984 Taboada ............................. 250/205

FOREIGN PATENT DOCUMENTS 0296427 6/1988 European Pat. Off. .

Primary Examiner—C. L. Albritton
Attorney, Agent, or Firm—Mason, Fenwick & Lawrence

[57] ABSTRACT

A laser beam controller for surveying equipment comprises a laser beam irradiation unit for irradiating a target with a laser beam, an observation unit for observing the laser beam reflected from the target and a light quantity controlling unit for controlling the quantity of the laser beam projected to the target. The laser beam controller is capable of constantly controlling the quantity of the laser beam incident on the observation optical system within a range which allows the observation of a laser beam spot and which has no harmful influence on the observer's eyes.

5 Claims, 4 Drawing Sheets

LASER BEAM CONTROLLER FOR SURVEYING EQUIPMENT

BACKGROUND OF THE INVENTION

The present invention relates to a laser beam controller for surveying equipment, and particularly to a laser beam controller for surveying equipment which enables control of the quantity of the laser beam projected to a target.

Conventional surveying equipment using a laser beam generally comprises a laser beam oscillating medium 1 for emitting a laser beam, leading the laser beam emitted to a measurement target T and applying the laser beam to the target T; an irradiation optical system 10 comprising a mirror 2, an objective lens 3 and so on; and an observation optical system 20 comprising the objective lens 3, a focusing lens 4, an ocular 5 and so on for leading the laser beam reflected from the target T to an observer. Such an arrangement permits the observer to perform the predetermined surveying work while simultaneously observing the reflected laser beam spot and a cruciform index of a target graticule 6.

In such surveying equipment, when a large quantity of a laser beam is projected to the eyes of the observer, the observer perceives this and can prevent the incidence of the harmful laser beam on their eyes for a long time, thereby ensuring that their eyes are safe from any harm. In addition, in order to prevent the accidental incidence of the laser beam on the eyes or skin of a person other than the observer, a shutter 7 is provided on the radiation path of the laser beam so as to enable the observer operating the shutter 7 to cut off the laser beam when a danger is perceived.

In actual surveying work using the above-described surveying equipment, in a case involving a relatively small quantity of a laser beam and a short observation time, the safety of the eyes of the observer is maintained. As described above, however, it it necessary to observe the reflected laser beam spot for a relatively long time because the observer operates the surveying equipment while simultaneously observing the reflected laser beam spot and the cruciform index of the target graticule 6. When the observer observes the reflected laser beam spot which is not dazzling but has a relatively large quantity, the eyes of the observer are exposed to the harmful laser beam for a long time. Thus the observer's eyes are damaged or severely strained.

On the other hand, the quantity of the reflected laser beam is generally in inverse proportion to the second power of the distance between the surveying equipment used and the target and in proportion to the reflectance of the target when the quantity of the laser beam is constant. The quantity of the reflected laser beam thus varies within a wide range in the actual surveying work in which work the distance and the reflectance of the target widely varies depending upon the conditions for use of the surveying equipment. Particularly, in tunnel work in which a base rock is a target, because the reflectance of the base rock changes hourly, the quantity of the reflected laser beam also changes. This change in the quantity of the laser beam cannot be easily noticed by the observer who operates the surveying equipment while simultaneously observing the reflected laser beam spot and the cruciform index of the target graticule 6. There is thus a danger of the observer's eyes being damaged or severely strained.

Even if the above-described shutter 7 is provided for protecting the observer's eyes, since the shutter 7 is operated on the basis of decisions made by the observer, it is difficult to definitely ensure the safety of the eyes.

On the other hand, surveying work using the surveying equipment, which projects the laser beam, requires a sufficient quantity of reflected laser beam to be maintained to observe the laser beam spot. This is because the surveying work cannot be performed when the overall quantity of laser beam emitted from the laser beam oscillating medium 1 is reduced to a quantity insufficient for observation, when the reflectance of the target is decreased to a small value, or when the distance to the target is increased.

In the surveying equipment which projects the laser beam, survey accuracy is generally increased upon a decrease in the size of the laser beam spot observed. For example, when the surveying equipment is used as a pointer, as shown in FIG. 6, since the deviation d between both optical axes is decreased upon a decrease in the size of the laser beam spot observed, an adjustment can be made more precisely. In the case of an observation with the naked eye, a deviation of $\frac{1}{8}$ to 1/10 of the laser beam spot size can be observed. This is true for a case where the present target is aimed at, a deviation from the present target is measured or a new target is established.

The size of the laser beam spot on the target T depends upon the illumination around the target T even if the intensity and the spread angle of the laser beam are constant. As shown in FIG. 7, the quantity of reflected laser beam and illumination around the target are shown on the ordinate, and the distance from the center of the laser beam spot is shown on the abscissa. In the drawing, the laser beam spot is shown as a curve 100. The diameter of the laser beam spot observed is AR, BR, CR at the levels AL, BL, CL, respectively, of illumination around the target. In the conventional surveying equipment, however, the observer cannot adjust the intensity of the laser beam projected to the target T and thus cannot set the laser beam spot to a desired size.

SUMMARY OF THE INVENTION

The present invention has been achieved with a view to solving the above problem, and it is an object of the present invention to provide a laser beam controller for surveying equipment which is capable of controlling the quantity of the laser beam projected to the observer's eyes through an observation optical system within a safe range, considering the quantity of the laser beam required for the surveying.

It is another object of the present invention to provide laser beam surveying equipment which permits the laser beam spot to bee adjusted to a desired size even if illumination around a target varies or the distance between the surveying equipment projecting the laser beam and the target varies.

In order to achieve the above objects, the present invention provides a laser beam controller for surveying equipment comprising a laser beam irradiation means for irradiating a target with a laser beam, an observation means for observing the laser beam reflected from the target, and a quantity controlling means for controlling the quantity of the laser beam projected to the target.

The laser beam controller for surveying equipment in accordance with the present invention allows the observer to control the quantity of the laser beam projected to the target to ensure the safety of the eyes and to adjust the size of the laser beam spot on the target, while observing the intensity of the laser beam on the target to be observed by the observation system, the laser beam spot size on the target and so on.

DETAILED DESCRIPTION OF PREFERRED EMBODIMENTS

Embodiments of the present invention are described below with reference to the drawings.

Figure 1:
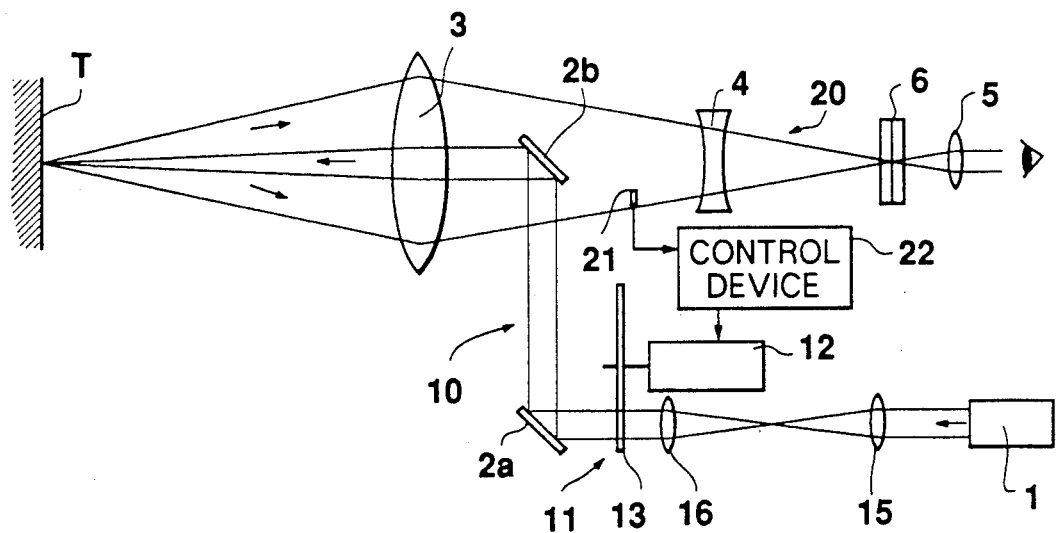
FIG. 1 is a drawing of the overall arrangement of a laser beam controller for surveying equipment in accordance with a first embodiment of the present invention.
Figure 5:
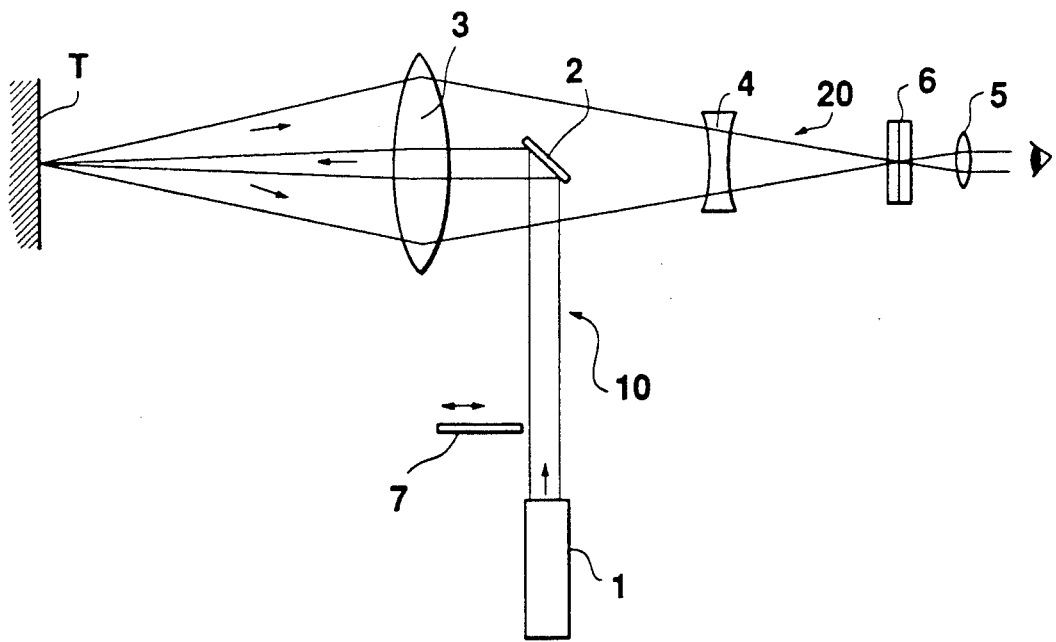
FIG. 5 is a drawing of the overall arrangement of a conventional laser beam controller for surveying equipment.
Figure 6:
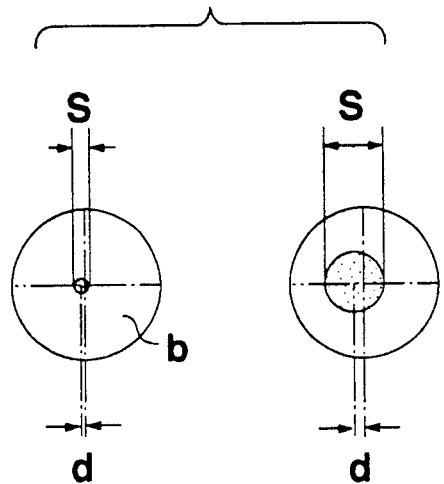
FIG. 6 is an explanatory view of the accuracy of coincidence between a laser beam spot size and an index.
Figure 7:
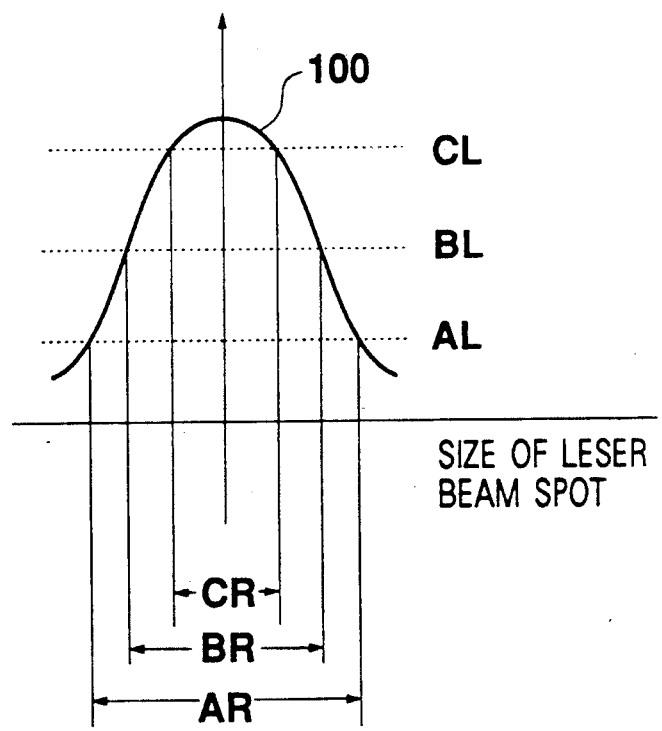
FIG. 7 is a graph showing a relation between the quantity of a reflected laser beam and illumination around a target and the size of a laser beam spot.

FIG. 1 shows the overall arrangement of a laser beam controller for surveying equipment to which a first embodiment of the present invention is applied. In the drawing, the same portions as those shown in FIG. 5 which shows conventional equipment are denoted by the same reference numerals.

In FIG. 1, an irradiation optical system 10 comprises a laser beam oscillating medium 1, for example, comprising a He-Ne gas laser for emitting a laser beam, first and second mirrors 2a, 2b for leading the laser beam emitted and an objective lens 3 for condensing the laser beam reflected from the mirrors 2a, 2b and applying it to a target T to be measured.

An observation optical system 20 comprises the objective lens 3 for condensing the laser beam reflected from the target T, a focusing lens 4 for focusing the laser beam emerging from the objective lens 3, a target graticule 6 on which the laser beam emerging from the focusing lens 4 is projected, and an ocular 5.

Figure 2:
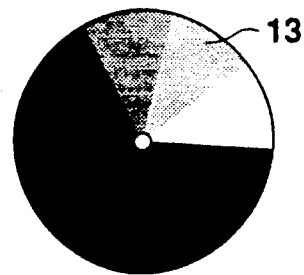
FIG. 2 is a drawing showing a filter for reducing the laser beam emitted.

A light receiving sensor 21 is disposed on the optical path of the observation optical system 20. The light receiving sensor 21 is electrically connected to the controller 22 described below for the purpose of detecting the quantity of the laser beam and supplying the detection signal to the controller 22. A beam attenuator 11 is provided on the optical path of the irradiation optical system 10. The beam attenuator 11 comprises a disc-shaped filter having density which changes in multiple stages (in this embodiment, 8 stages) in the circumferential direction, as shown in FIG. 2. The beam attenuator 11 is connected to the shaft of a stepping motor 12 which is electrically connected to the controller 22. The density of the beam attenuator 11, i.e., the quantity of the laser beam, is therefore controlled by using the controller for controlling the rotational angle of the stepping motor 12.

Figure 3:
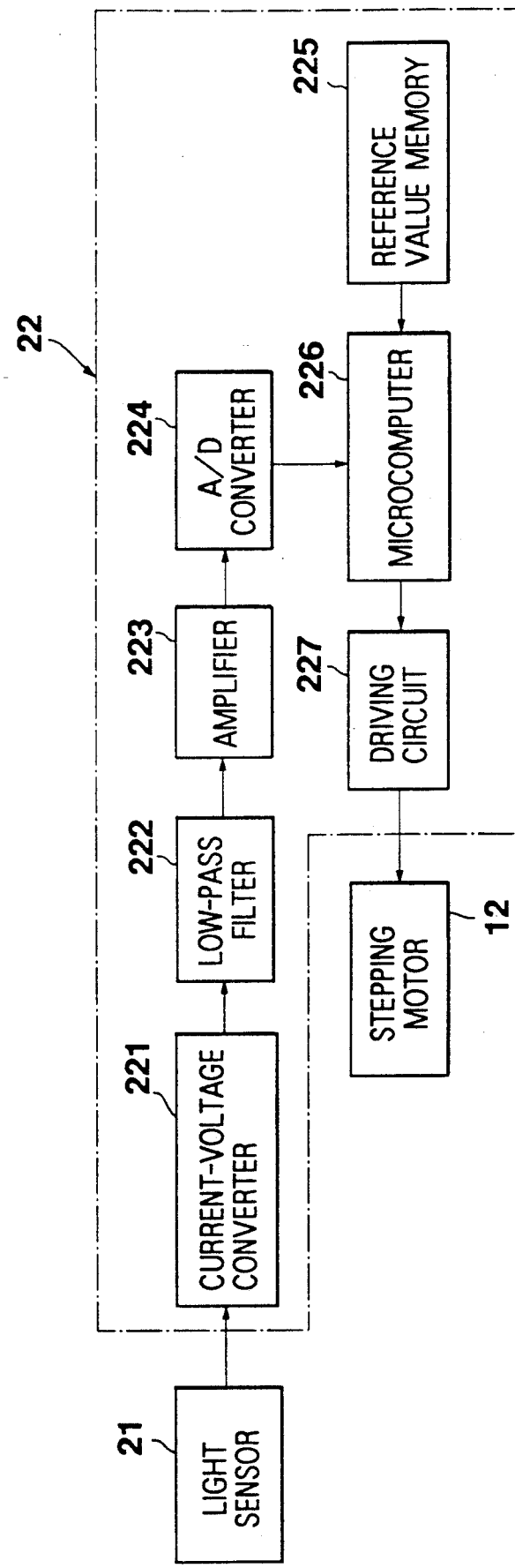
FIG. 3 is a drawing of the circuit of a controller for controlling the filter shown in FIG. 2.

FIG. 3 shows the configuration of the circuit of the controller 22. The controller 22 comprises a current-voltage converter 221 for converting a current signal output from the light receiving sensor 21 into a voltage signal, a low-pass filter 222 for cutting off the noise of the voltage signal output from the current-voltage converter 221, an amplifier for amplifying the signal output from the low-pass filter 222, an A/D converter 224 for converting the voltage analogue signal output from the amplifier 223 into a digital signal, a reference value memory 225 for storing a reference value of the quantity of the laser beam emitted, a microcomputer 226 for calculating the rotational angle of the stepping motor 12 from the signal output from the A/D converter 224 and the reference value stored in the reference value memory 225, and a driving circuit for driving the stepping motor 12 in accordance with the control signal output from the microcomputer 226.

In the above-described arrangement, the quantity of the laser beam reflected from the target T and incident on the observation optical system is constantly detected by the light receiving sensor 21. The quantity detected is compared with the reference value stored in the reference value memory 225 by the microcomputer 226, and the stepping motor 12 is driven in accordance with the result of comparison. The density of the attenuator 11 is controlled by rotating the attenuator 11 so that the quantity of the laser beam incident on the observation optical system is an optimum value, whereby the quantity of the laser beam emitted can be controlled to an optimum value. As a result, the quantity of the laser beam incident on the observation optical system can be constantly controlled to a value within an appropriate range which allows the observation of a spot of the laser beam and which has no harmful influence on the observer's eyes even if the distance between the surveying equipment and the target or the reflectance of the target changes.

Figure 4:
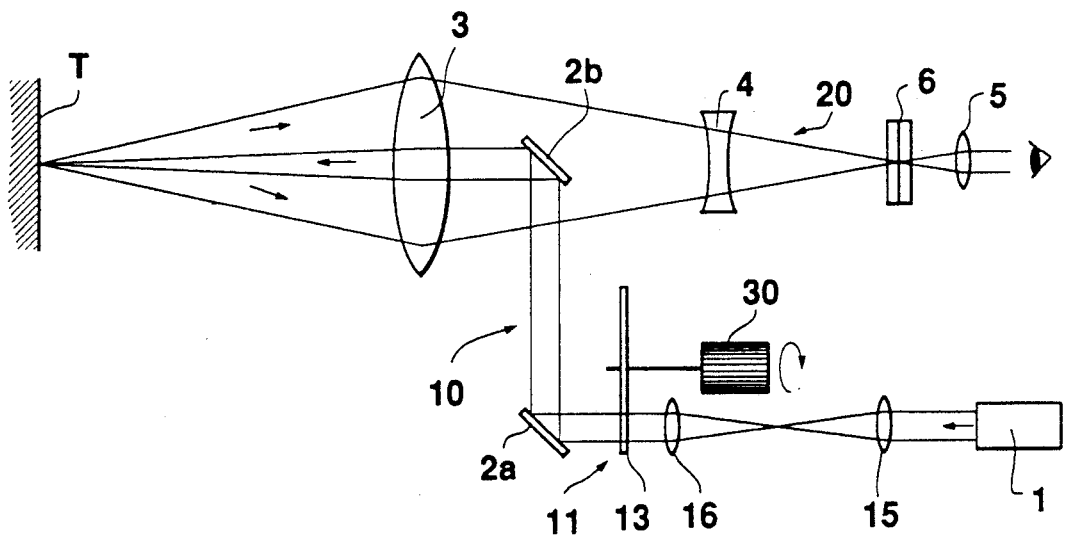
FIG. 4 is a drawing of the overall arrangement of a second embodiment of the present invention.

FIG. 4 shows a laser beam controller for surveying equipment to which a second embodiment of the present invention is applied. In FIG. 4, the same portions as those in the first embodiment shown in FIG. 1 are denoted by the same reference numerals and are not described below. The second embodiment has a manual nob 30 provided in place of the stepping motor 12 for rotating the attenuator 11 in the first embodiment. The observer operates the nob 30 so as to rotate the attenuator 11 in consideration of the highest intensity of the laser beam which is likely incident on the observer's eyes and the size of the laser beam spot.

The present invention can be carried out not only in the above-described embodiments but also in various other embodiments. For example, the light receiving sensor can be provided between the objective lens 3 on the optical path of the observation optical system and the target T, or directly on the target T.

The light receiving sensor need not be provided directly on the optical path of the observation optical system, and part of the laser beam reflected from a beam splitter, a half mirror or the like, which is provided on the optical path, may be led to the light receiving sensor disposed outside the optical path of the observation optical system. Alternatively, the light receiving sensor may be disposed at a position which is near the optical path of the observation optical system and which allows the sensor to receive the reflected laser beam.

In addition, although each of the embodiments of the present invention uses as a means for attenuating the laser beam emitted the filter having density which changes in a multistage form in the circumferential direction, the attenuating means is not limited to this. A filter having density which continuously changes or other means, e.g., a variable aperture or a polarizing plate may be used. The present invention can also be carried out in embodiments involving various driving methods, the installation positions and the like.

Further, since the embodiments of the present invention use as the laser beam oscillating medium the He-Ne gas laser which cannot be controlled in its radiation amount, the laser beam emitted from the medium is attenuated later. However, when a laser beam oscillating medium such as a semiconductor laser diode or the like which can be controlled in its radiation amount, the quantity of the laser beam emitted from the medium can be directly controlled in accordance with the detection output from the light receiving sensor.

As described above, the laser beam controller for surveying equipment of the present invention is capable of constantly controlling the quantity of the laser beam incident on the observation optical system within a range, which allows the observation of a laser beam spot and has no harmful influence on the observer's eyes.

What is claimed is:

1. A laser beam controller for surveying equipment comprising laser beam irradiation means for irradiating a target with a laser beam, observation means for observing the laser beam reflected from said target and light quantity controlling means for controlling the quantity of the laser beam projected to said target.

2. A laser beam controller for surveying equipment according to claim 1, wherein said light quantity controlling means continuously controls the quantity of the laser beam projected to said target.

3. A laser beam controller for surveying equipment according to claim 1, wherein said light quantity controlling means stepwise controls the quantity of the laser beam projected to said target.

4. A laser beam controller for surveying equipment according to claim 1, wherein said observation means has laser beam detecting means for measuring the quantity of the laser beam reflected from said target.

5. A laser beam controller for surveying equipment according to claim 4, wherein said light quantity controlling means controls the quantity of light on the basis of the output from said laser beam detecting means.

* * * * *